United States Patent

[11] 3,624,249

[72] Inventor Carl S. Marvel
 Tucson, Ariz.
[21] Appl. No. 425
[22] Filed Jan. 2, 1970
[45] Patented Nov. 30, 1971
[73] Assignee Research Corporation
 New York, N.Y.

[54] "PYRROLONE-ANTHRAQUINONE POLYMERS"
 8 Claims, No Drawings
[52] U.S. Cl. .................................................... 260/47 CP,
 260/308 DS, 260/63 R, 260/65, 260/78 TF,
 260/262, 260/346.3
[51] Int. Cl. ...................................................... C08g 20/32,
 C08g 33/02
[50] Field of Search ........................................... 260/47 CP,
 65, 78 TF, 63, 2

[56] References Cited
 UNITED STATES PATENTS
 3,414,543 12/1968 Paufler .......................... 260/47
 3,518,232 6/1970 Bell .............................. 260/78

Primary Examiner—William H. Short
Assistant Examiner—L. L. Lee
Attorney—Stowell and Stowell ABSTRACT: The condensation of an aromatic tetraamine with an aromatic tetracarboxylic acid dianhydride, at least one of which contains an anthraquinone moiety, yields pyrrolone-anthraquinone polymers. These polymers are solubilized by reduction of the quinone function present to the hydroquinone form. Solutions containing the hydroquinone form are wet-spun into fibers, temperature-stable on oxidation back to the quinone form.

PYRROLONE-ANTHRAQUINONE POLYMERS

This invention relates to pyrrolone-anthraquinone polymers.

One of the practical difficulties encountered in using many of the presently known thermally stable organic polymers is that of fabrication. The ladder and many of the partial ladder structures of superior stability now available usually do not melt below 400° C. and are generally insoluble in most all solvents except perhaps concentrated sulfuric acid.

I have discovered that thermally stable polymers more amenable to fabrication can be prepared by inclusion of a reducible anthraquinone moiety in a recurring structural unit of the polymer. Such polymers can be solubilized by reduction and in the solubilized form can be wet spun into fibers or cast into a film. On acidification and exposure to air, the fibers and film in reduced hydroquinone form reoxidize back to the insoluble and more thermally stable quinone form.

More specifically, the polymer compositions of the present invention are characterized by the presence of the following recurring structural units:

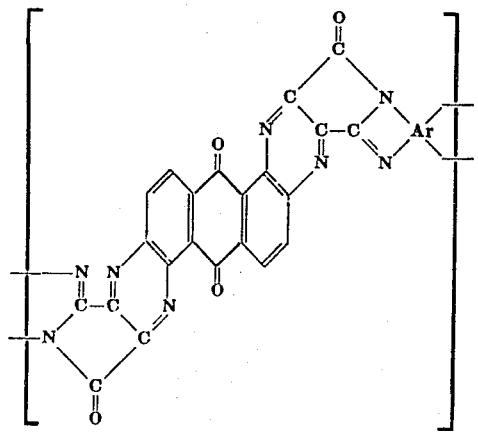

or

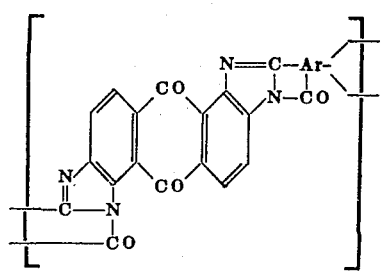

wherein Ar represents a tetravalent aryl radical, particularly a carbocyclic radical of the benzene and naphthalene series.

The polymeric compositions of the invention are prepared by the polycondensation reaction of an aromatic tetraamine having paired adjacent amino groups with an aromatic tetracarboxylic acid dianhydride. As will be more fully illustrated below, one or both of the reactants may contain an anthraquinone moiety. The polycondensation is best effected in a high boiling solvent such as dimethylacetamide or preferably tetramethylene sulfone at about 150°–160° C. for several hours. The polymeric solid, which precipitates out of solution during the course of the reaction and/or is precipitated after the reaction, is separated by filtration and generally heated at 250°–350° C. for several hours under reduced pressure to drive off any residual solvent and to complete ring closure condensation.

A preferred series of polymeric compositions wherein the quinone function is present in the dianhydride moiety is prepared by the polycondensation of 1,2,5,6-bis-($\alpha,\beta$-dicarboxyl-pyrazino)anthraquinone dianhydride with aryl tetraamines such as 1,2,4,5-tetraaminobenzene, 3,3',4,4'-tetraaminodiphenyl and 3,3',4,4'-tetraaminodiphenyl ether. A preferred series of polymeric compositions wherein the quinone function is present in the tetraamine moiety is prepared by the polycondensation of 1,2,5,6-tetraaminoanthraquinone with an aryl tetracarboxylic acid dianhydride such as pyromellitic anhydride and 1,4,5,8-naphthalenetetracarboxylic dianhydride. A polymeric composition wherein the quinone function is present in both the dianhydride and tetraamine moieties is prepared by the polycondensation of 1,2,5,6-bis($\alpha,\beta$-dicarboxylpyrazino)anthraquinone dianhydride with 1,2,5,6-tetraaminoanthraquinone. The latter condensations are acid-catalyzed; superior results are obtained with trifluoroacetic acid as the catalyst; or in polyphosphoric acid as the catalyst-solvent.

The present invention is further illustrated by means of the following examples which show the preparation of the intermediates utilized and representative polymers according to the invention.

I. INTERMEDIATES

A. 1,2,5,6-Tetraaminoanthraquinone

In a 500 ml. three-necked flask equipped with a heating jacket, a mechanical stirrer and a reflux condenser were placed 100 ml. of glacial acetic acid, 100 ml. of acetic anhydride, 50 g. of 2,6-diaminoanthraquinone, and about 0.5 ml. of concentrated sulfuric acid. The reaction mixture was heated to boiling and refluxed with stirring for 2 hours (the diaminoanthraquinone did not dissolve but changed color during acetylation). The reaction mixture was cooled, filtered and washed with some glacial acetic acid and the solid product dried in a vacuum oven. There was obtained 67 g. of 2,6-diacetaminoanthraquinone as a brown solid. The crude product was purified by recrystallization from acetic acid, nitrobenzene or most readily from dimethylformamide.

In a 500-ml. three-necked flask, equipped with a mechanical stirrer and a thermometer, was placed 400 g. of concentrated sulfuric acid and 50 g. of potassium nitrate. After cooling in an ice bath, 25 g. of finely divided diacetaminoanthraquinone was added to the vigorously stirred mixture keeping the temperature below 5° C. The diacetamino compound dissolved within 30 minutes and the nitration was continued for 4 hours at a 0°–5° C. The reaction mixture was decomposed with excess ice; the solid product was separated by filtration and washed thoroughly until the filtrate was acid-free. After drying in a vacuum oven at 60° C., the yellow 1,5-dinitro-2,6-diacetaminoanthraquinone was purified by recrystallization from dimethylsulfoxide.

In a two-necked, 1-liter flask, equipped with a mechanical stirrer, 400 ml. of sulfuric acid was mixed with 200 ml. of water to give 80 percent sulfuric acid. The mixture was cooled and 40 g. of dinitrodiacetaminoanthraquinone added. The flask was then heated to 95° C. and held at this temperature for 90 minutes when hydrolysis was complete. The reaction mixture was poured on 1.5 kg. of ice, the solid product separated by filtration and washed until acid-free. 1,5-Dinitro-2,6-diaminoanthraquinone was obtained as a dark brown filter cake.

The still wet cake, prepared as described above, was transferred to a two-necked, 1-liter flask, equipped with a mechanical stirrer. Additional water was added bringing the total weight of the cake plus the water to 400 g. 90 g. of $Na_2S_9 \cdot H_2O$ was added and the reaction mixture stirred while heated on a steam bath for 1 hour. The mixture turned violet as the reduction proceeded in solid phase. The flask was cooled, the product separated by filtration and washed several times with distilled water until the filtrate was neutral. The black product was dried in vacuo at 50° C. 25 g. of dinitrodiacetaminoanthraquinone yielded 15 g. of tetraaminoanthraquinone which was purified by recrystallization from boiling acetophenone.

B. 1,2,5,6-(α,β-dicarboxylpyrazino)anthraquinone dianhydride

To a solution of 1 g. of 1,2,5,6-tetraaminoanthraquinone in 25 ml. of dimethylacetamide 2 added 2.5 g. of dihydroxytartaric acid. After standing at room temperature for 2 hours, the resultant precipitate of tetracarboxylic II. adduct was separated by filtration, washed with acetic acid and dried for 3 hours at 80° C.

One gram of the tetracarboxylic acid adduct was refluxed with 25 ml. of acetic anhydride for 2 hours. The resultant dianhydride was separated by filtration, washed with a small portion of acetic acid and dried in vacuum.

II. POLYMERS

A. Poly [(4,14-dihydro-4,12,14-trioxoisoindolo[2,1-a]anthra[2,1-d:5,6-d']diimidazole-1,2,9,10(12H)-tetrayl)-10-carbonyl]

A mixture of 0.8590 g. (0.0033 mole) of 1,2,5,6-tetraaminoanthraquinone and 0.7198 g. (0.0033 mole) of pyromellitic anhydride in 30 ml. of dimethylacetamide was stirred under nitrogen at room temperature for 1 hour. The temperature was then raised to 160° C. and kept there for 4½ hours. The reaction mixture was poured into 500 ml. of ligroin and filtered to give 1.5 of a polymer with an inherent viscosity of 0.08. Heating the polymer for 7 hours at 250° C. raised the inherent viscosity to 0.1, additional heating for 3 hours at 310° C. raised it to 0.15 and further heating for 3 hours at 350° C. raised it to 0.2, 0.2 percent concentration in concentrated sulfuric acid at 30° C.

The reaction of 0.4295 g. (0.00165 mole) of 1,2,5,6-tetraaminoanthraquinone and 0.3599 g. (0.00165 mole) of pyromellitic anhydride was carried out in 40 ml. of dimethylacetamide and 4 ml. of trifluoroacetic acid to yield 0.6 g. (76 percent) of a polymer with an inherent viscosity of 0.53, which was not raised by heating further. (A similar reaction with glacial acetic acid or sulfuric acid as the catalyst gave lower molecular weight polymer.

B. Poly [(4,16-dihydro-4,8,16-trioxo-1,8,H-benz [de]imidazo [4", 5": 5'6'] anthra [1', 2': 4, 5] imidazo [2, 1-a] isoquinoline-1,2,11,12-tetrayl)-11-carbonyl.

The following two-step procedure gives rise to a particularly desirable high molecular weight polymer:

Into a 2-liter three-neck round bottom flask, equipped with a mechanical stirrer and water cooled reflux condenser, and continuously flushed with dry nitrogen, was placed 26.8 g. of 1,4,5,8-naphthalenetetracarboxylic dianhydride (0.1 mole) and 1 liter of N,N-dimethylacetamide. To the stirred mixture 25.8 g. (0.1 mole) of 1,2,5,6-tetraaminoanthraquinone was added, followed by 100 ml. glacial acetic acid. The mixture was stirred while the temperature was raised, during 1 hour, to 160° C. This temperature was maintained for 5 hours. The mixture was cooled over night and the fine black precipitate was removed by filtration through a 500 ml. course sintered glass funnel. The filter cake was washed with three 100 ml. portions of dimethylacetamide and three 100 ml. portions of ethanol. The black solid was then extracted in a Soxhlet with ethanol for 12 hours. The yield of prepolymer was dried under vacuum at 110° C. for 2 days. In a 2-liter three-neck round-bottom flask, equipped with a mechanical stirrer, and continuously flushed with dry nitrogen, was placed 2 kg. of polyphosphoric acid. The flash was heated in an oil bath to 110° C. and this temperature was maintained for 12 hours. The acid was cooled to room temperature and 16 g. of the above prepolymer was added slowly. After the prepolymer was completely dispersed into the polyphosphoric acid, the temperature was raised to 120° over a period of 1.5 hours and maintained at that temperature for 3 hours. The temperature was then increased to 175° C. over a period of an hour and held at that temperature still with stirring for an additional 3 hours. After the reaction solution had cooled to room temperature, it was poured slowly onto about 4 kg. of crushed ice. The resultant dark green precipitate was separated by filtration through a course sintered glass funnel. The solid product was washed with water until the filtrate was acid free, and then extracted in a Soxhlet with water for 12 hours, dimethylacetamide for 6 hours and ether for 1 hours. The polymer was dried under vacuum at 110° C. for 12 hours. The product yield was 15 g. of dark green powder, inherent viscosity of 2.2, c=b 0.25 g./100 ml. in concentrated sulfuric acid.

C. Poly[16,18-dihydro-5,16,18trioxoimidazo[4",5":5',6'A]benzimidazo[',2':1,2]pyrrolo[3,4-b]benzo [1,2-f:4,5-f']diquinoxaline-2,3:11,12(5H)-tetrayl)-11-carbonyl]

1,2,5,6-bis(α,β-dicarboxylpyrazino)anthraquinone dianhydride (0.9 g.) and 1,2,4,5-tetraaminobenzene tetrahydrochloride (0.6 g.) were mixed with 25 ml. of dimethylacetamide or tetramethylene sulfone in a three-necked flask provided with a mechanical stirrer and the mixture heated at 150° for 4 hours under nitrogen. The reaction mixture was poured into petroleum ether, filtered and the separated solid dried at 120° C. under vacuum for a day at room temperature and then for another day at 250° C. Finally, the polymer was heated at 300° C. for 4 hours at 0.5 mm. Hg. The inherent viscosity was 0.2 (dimethylacetamide) or 0.45 (tetramethylene sulfone), 0.25 percent concentration in concentrated sulfuric acid at 30° C.

D. Poly[8,10,17,22-tetrahydro-4,8,10,17,22-pentaoxoimidazo[4 ",5 ":5",6"]anthra[1"',2":4',5'3,4imidazo[1',2':1,2]pyrrolo[3,4-b]benzo[1,2-f:4,5-f']diquinoxaline-1,2(4H):14,15-tetrayl)-15-carbonyl]

1,2,5,6,-tetraaminoanthraquinone (0.536 g.) and 0.904 g. of 1,2,5,6-bis(αβ-dicarboxyl pyrazino)anthraquinone dianhydride were condensed in dimethylacetamide or tetramethylenesulfone as previously described and finally heated at 300°-350° C. to get a closed ring structure. The inherent viscosity was 0.18 (dimethylacetamide) or 0.32 (tetramethylenefulfone), 0.25 percent concentration in concentrated sulfuric acid at 30° C.

E. Poly[(6,8,18,20-tetrahydro-6,8,18,20-tetraoxobisbenzimidazo[1',2':1,2]pyrrolo[3,4-b:3',4'-b]benzo[1,2-f:4,5-f']diquinoxaline-2,15-diyl)oxy]

3,3',4,4'-tetraaminodiphenyl ether (0.456 g.) and 0.904 g. 1,2,5,6-bis(α,β-dicarboxylpyrazino)anthraquinone dianhydride were condensed in dimethylacetamide and tetramethylene sulfone as in the previous examples. Inherent viscosity 0.2 (dimethylacetamide) or 0.48 (tetramethylene sulfone), 0.25 percent concentration in concentrated sulfuric acid at 30° C.

F. Poly(17,19-dihydro-5,15,17,19-tetraoxo-5H,15H bisbenzimidazo[1',2':1,2]pyrrolo[3,4-b:3',4'-b']benzo[1,2-f:5,4-f']diquinoxaline-11,22-diyl)

3,3',4,4'-Tetraaminodiphenyl (0.43 g.) and 1,2,5,6-bis-(α,β—dicarboxylpyrazino) anthraquinone dianhydride (0.90 g.) were condensed in dimethylacetamide or tetramethylene sulfone as in the previous examples. Inherent viscosity 0.17 (dimethylacetamide) or 0.53 (tetramethylene sulfone), 0.25 percent concentration in concentrated sulfuric acid at 30° C.

The polymeric compositions of the present invention are highly colored, powdery materials, insoluble in common organic solvents and, being thermally resistant (very little weight loss on heating up to 600° C.), did not always burn completely during the course of carbon-hydrogen combustion analysis. Their structures were confirmed by comparison with model compounds.

III. FIBER FORMATION

A. A 0.14 g. portion of the polymer from example II-A was reduced in 1.4 ml. of 90 percent aqueous dimethylsulfoxide solution containing 0.5 g. of Na₂S₂O₄ and 0.5 g. of KOH to form a viscous solution. A fiber was spun by injection of the solution into 1 N solution of hydrochloric acid.

B. A mixture of 1 g. of NaOH 1 g. of sodium dithionate, 1 ml. of water and 9 ml. of dimethylsulfoxide was placed in a 50 ml. three-neck flask equipped with mechanical stirrer and swept continuously with dry nitrogen. A 1 g. portion of the polymer from example II–B was added and the mixture stirred at room temperature. After 2 hours only a small amount of solid polymer remained undissolved by further treatment. Filaments were spun from the solution by extrusion through various gauge needles into 1N aqueous hydrochloric acid.

C. A portion of the polymer from example II–F was dissolved under nitrogen in a mixture of 80 percent dimethylsulfoxide in water containing 10 percent of Na₂S₂O₄ and 10 percent of KOH. A 10 percent solution of the polymer was extruded from a syringe into a dilute hydrochloric acid solution to precipitate the hydroanthraquinone form of the polymer as a fiberlike filament.

Fibers prepared as above gradually darkened on standing; heating in air completed oxidation to the more stable quinone form. The oxidized fibers, generally in admixture with other fibers, can be woven or knit into heat resistant fabrics.

I claim:

1. Film and fiber forming polymers consisting essentially of the recurring structural unit:

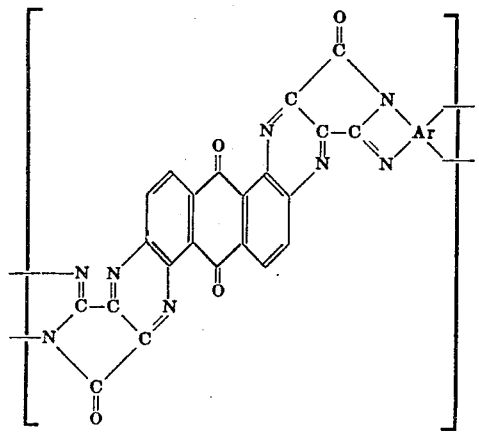

Wherein AR represents a tetravalent carbocyclic radical of the benzene or naphthalene series.

2. Polymers according to claim 1 wherein Ar is

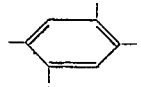

3. Polymers according to claim 1 wherein Ar is

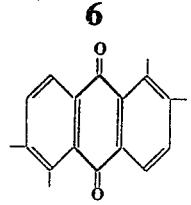

4. Polymers according to claim 1 wherein Ar is

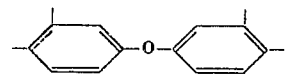

5. Polymers according to claim 1 wherein Ar is

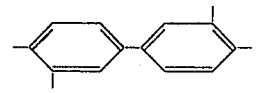

6. Film and fiber forming polymers consisting essentially of the recurring structural unit:

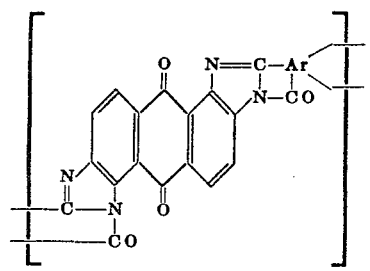

Wherein AR represents a tetravalent carbocyclic radical of the benzene or naphthalene series.

7. Polymers according to claim 6 wherein Ar is

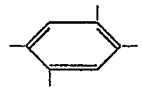

8. Polymers according to claim 6 wherein Ar is

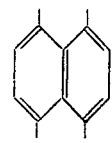

* * * * *